United States Patent
Senoo et al.

(10) Patent No.: US 9,636,982 B2
(45) Date of Patent: May 2, 2017

(54) REAR VEHICLE-BODY STRUCTURE OF VEHICLE

(71) Applicant: MAZDA MOTOR CORPORATION, Hiroshima (JP)

(72) Inventors: Takashi Senoo, Hiroshima (JP); Kouichi Matsumoto, Hiroshima (JP); Takashi Niseki, Hiroshima (JP); Masaki Oda, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 15/004,067

(22) Filed: Jan. 22, 2016

(65) Prior Publication Data

US 2016/0236559 A1 Aug. 18, 2016

(30) Foreign Application Priority Data

Feb. 16, 2015 (JP) ................................. 2015-027121

(51) Int. Cl.
| | | |
|---|---|---|
| *B60J 7/20* | (2006.01) | |
| *B62D 25/08* | (2006.01) | |
| *B60J 7/14* | (2006.01) | |
| *B60J 1/18* | (2006.01) | |

(52) U.S. Cl.
CPC ............. *B60J 7/202* (2013.01); *B60J 1/1823* (2013.01); *B60J 7/143* (2013.01); *B62D 25/08* (2013.01)

(58) Field of Classification Search
CPC ... B60J 1/1823; B60J 7/143; B60J 7/20; B60J 7/202; B62D 25/08
See application file for complete search history.

(56) References Cited

U.S. PATENT DOCUMENTS

| | | | | |
|---|---|---|---|---|
| 2,013,314 | A * | 9/1935 | Metz .......................... | B60J 7/04 292/DIG. 5 |
| 4,718,710 | A * | 1/1988 | Iwamura .................... | B60J 7/11 248/220.21 |
| 5,197,778 | A * | 3/1993 | Burst ....................... | B60J 7/202 296/107.08 |

(Continued)

FOREIGN PATENT DOCUMENTS

| | | | | |
|---|---|---|---|---|
| DE | 19912893 | A1 * | 9/2000 | ............. B60J 7/198 |
| DE | 10107079 | A1 * | 8/2002 | ............. B60J 7/202 |

(Continued)

*Primary Examiner* — Glenn Dayoan
*Assistant Examiner* — Paul Chenevert
(74) *Attorney, Agent, or Firm* — Studebaker & Brackett PC

(57) ABSTRACT

A rear vehicle-body structure of a vehicle comprises a storage compartment for storing an openable roof and a back window portion, a deck cover provided to cover over the storage compartment, the deck cover comprising a pair of right-and-left cover side wall portions which are provided to be spaced apart from each other in a vehicle width direction and stand upward and a header portion which is provided to interconnect respective upper ends of the cover side wall portions at a position close to, in a vehicle longitudinal direction, the roof, a cover opening/closing mechanism provided to move the deck cover upward, and a pair of right-and-left front-lower regulation structures provided to regulate positions of respective lower portions of the cover side wall portions relative to the vehicle body.

15 Claims, 10 Drawing Sheets

(56) References Cited

U.S. PATENT DOCUMENTS

| | | | | |
|---|---|---|---|---|
| 5,558,389 | A | * | 9/1996 | Rothe ............... B60J 7/202 296/107.08 |
| 5,823,606 | A | * | 10/1998 | Schenk ............. B60J 7/205 296/107.08 |
| 6,033,008 | A | * | 3/2000 | Mattila ............. B60J 1/1823 296/107.17 |
| 6,585,310 | B1 | * | 7/2003 | Guillez ............. B60J 1/1823 296/107.01 |
| 6,776,447 | B2 | * | 8/2004 | Hess ................ B60J 7/202 296/107.17 |
| 6,832,805 | B2 | * | 12/2004 | Quindt ............. B60J 1/1823 296/107.08 |
| 7,032,952 | B2 | * | 4/2006 | Dilluvio ............ B60J 7/205 296/107.08 |
| 7,513,563 | B2 | * | 4/2009 | Guillez ............. B60J 7/146 296/107.17 |
| 7,959,210 | B2 | * | 6/2011 | Mangold .......... B60J 7/202 296/107.08 |
| 8,240,742 | B2 | * | 8/2012 | Lowak ............. B60J 7/20 296/107.08 |
| 2002/0105205 | A1 | * | 8/2002 | Willard ............ B60J 7/19 296/107.07 |
| 2008/0116712 | A1 | | 5/2008 | Cimatti et al. |
| 2008/0277975 | A1 | * | 11/2008 | Biecker ............ B60J 7/198 296/224 |
| 2009/0108638 | A1 | * | 4/2009 | Wegener .......... B60J 7/20 296/224 |
| 2010/0194138 | A1 | * | 8/2010 | Matthes ........... B60J 7/0084 296/107.04 |
| 2016/0031306 | A1 | * | 2/2016 | Diehl ............... B60J 7/1265 296/136.06 |
| 2016/0089965 | A1 | * | 3/2016 | Matsumoto ...... B60J 7/202 296/37.5 |
| 2016/0089966 | A1 | * | 3/2016 | Matsumoto ...... B60J 1/1823 296/107.08 |
| 2016/0185197 | A1 | * | 6/2016 | Ueoka ............. B60J 7/143 296/107.08 |

FOREIGN PATENT DOCUMENTS

| | | | | |
|---|---|---|---|---|
| DE | 102004038433 A1 | * | 2/2006 | ............ B60J 7/1855 |
| DE | 102005058714 A1 | * | 3/2007 | ............ B60J 7/1855 |
| DE | 102005058715 A1 | * | 3/2007 | ................ B60J 7/20 |
| DE | 102006001473 A1 | * | 7/2007 | ................ B60J 7/20 |
| DE | 102006042197 A1 | * | 3/2008 | .............. B60J 7/198 |
| DE | WO 2008055487 A1 | * | 5/2008 | ............ B60J 7/1265 |
| DE | EP 1935690 A2 | * | 6/2008 | ............ B60J 7/1265 |
| DE | 102012023569 A1 | * | 7/2013 | ................ B60J 7/20 |
| DE | 102014017353 A1 | * | 5/2016 | .............. B60H 7/20 |
| FR | 2851505 A1 | * | 8/2004 | .............. B60J 7/202 |
| FR | 2891235 A1 | * | 3/2007 | ................ B60J 7/20 |
| FR | EP 1798088 A1 | * | 6/2007 | ................ B60J 7/20 |
| FR | 2897585 A1 | * | 8/2007 | .............. B60J 7/143 |

\* cited by examiner

REAR VEHICLE-BODY STRUCTURE OF VEHICLE

BACKGROUND OF THE INVENTION

The present invention relates to a rear vehicle-body structure of a vehicle comprising a deck cover which is provided to cover over a storage compartment storing an openable roof and connected to a vehicle body so as to open or close.

There is a type of vehicle, a so-called open car, in which a passenger cabin is coved with an openable roof. In this type of vehicle, the openable roof is configured to be folded and stored in a storage compartment which is provided at a vehicle rear portion so that an upper portion of the cabin portion can be open.

US Patent Application Publication No. 2008/0116712 A1, for example, discloses a vehicle equipped with an openable roof (6) which comprises a front roof (11) positioned at a vehicle front side and a rear roof (12) positioned at vehicle rear side and pivotally supported at a stand portion (9) rising from a vehicle body and a storage compartment (24) which stores the openable roof (6) at a rear portion of the vehicle body.

In the vehicle of the above-described patent document, a back window (28) is moved downward and stored in a vehicle compartment, and then the front roof (11) is moved upward and rearward with its rotational axis (13) positioned at a connection point of the front roof (11) and the rear roof (12).

Subsequently, the front roof (11) and the rear roof (12) are moved rearward and upward together with a rotational axis (8) positioned at a connection point of the rear roof (12) and the stand portion (9), so that they are stored in the storage compartment (24).

In the vehicle equipped with the above-described openable roof, the storage compartment for storing the openable roof is covered with the openable deck cover so that the vehicle's exterior appearance does not deteriorate regardless of an opening/closing state of the openable roof.

Herein, an opening/closing structure in which the deck cover (25) is rotated by means of a hinge to rotatably connect a rear end of the deck cover (25) and the vehicle body, which is disclosed in the above-describe patent document, for example, is known as an opening/closing structure of the openable deck cover.

Moreover, as another opening/closing structure of the deck cover is known an opening/closing structure in which the deck cover is moved substantially in parallel so as to rise upward by means of plural link members connecting the deck cover ant the vehicle body and a drive mechanism to rotate the link members, for example.

Herein, in a case of the deck cover being configured such that protrusion portions (27) which protrude upward in a fin shape at a position behind a passenger are arranged side by side with a specified distance, in the vehicle width direction, therebetween like the structure disclosed in the above-described patent document, this deck cover becomes larger-sized and heavier and also the height of the gravity of this deck cover becomes higher, compared with a flat-plate shaped deck cover.

In a case in which the above-described high and large-sized deck cover is operated so as to be moved upward substantially in parallel, there is a problem that the deck cover may shake easily due to the wind or its size, so that the operational state (opening/closing) of the deck cover becomes improperly unstable.

Further, in a case in which there is provided a header portion which is arranged close to the openable roof in a vehicle longitudinal direction and connects the protrusion portion in a vehicle width direction, for example, there is a concern that the deck cover becomes so large-sized that the operational state (opening/closing) of the deck cover may become more unstable.

Therefore, there is a concern that there may occur a problem caused by a contact of a lower portion of the deck cover with the vehicle body when the deck cover is closed, another problem of opening/closing failure caused by the deck cover being closed in a state of being twisted relative to the vehicle body, or the like.

SUMMARY OF THE INVENTION

The present invention has been devised in view of the above-described problems, and an object of the present invention is to provide a rear vehicle-body structure of a vehicle which can properly suppress a position shift of the lower portion of the deck cover relative to the vehicle body when the vertically-high and large-sized deck cover is closed.

The present invention is a rear vehicle-body structure of a vehicle, comprising a storage member comprising a roof covering over an upper portion of the vehicle and/or a back window positioned in back of the roof, a storage compartment formed at a vehicle body for storing the storage member from above of the vehicle, a deck cover provided to cover over the storage compartment, the deck cover comprising a pair of right-and-left cover side wall portions which are provided to be spaced apart from each other in a vehicle width direction and stand upward and a header portion which is provided to interconnect respective upper ends of the cover side wall portions at a position close to, in a vehicle longitudinal direction, the roof, a cover opening/closing mechanism provided to move the deck cover upward, and a pair of right-and-left positioning mechanisms provided to regulate positions of respective lower portions of the cover side wall portions relative to the vehicle body.

The above-described roof can be a soft top (convertible top) which is storable by being folded rearward and formed by awning cloth and frame, or a hard top which is storable by being folded rearward and made from metal, resin, or the like. Alternatively, a roof which is fixed to the upper portion of the cabin portion may be applied.

The above-described deck cover can be a deck cover which is formed in a roughly gate shape in a front view by a cover-side wall portion and a header portion, another deck cover which is formed by a cover-side wall portion formed in the roughly gate shape in the front view and a header portion, or the like. The above-described cover opening/closing mechanism can be a mechanism to move the deck cover with an electromotive means or an oil-pressure drive, or a manually-operational mechanism.

The above-described positioning mechanism can be the one which conducts positioning in the vehicle width direction, in the vehicle vertical direction, or in the vehicle longitudinal direction. Alternatively, it can be the one which can conduct positioning in all of these directions.

According to the present invention, the position shift of the lower portion of the deck cover relative to the vehicle body can be suppressed when the vertically-high and large-sized deck cover is closed. Specifically, the present rear vehicle-body structure of the vehicle can properly suppress the position shift of the deck cover relative to the vehicle body, especially the respective shift positions of the lower portions of the cover side wall portions, by means of the pair of right-and-left positioning mechanisms to regulate the positions of the lower portions of the cover side wall portions relative to the vehicle body.

Accordingly, the present rear vehicle-body structure of the vehicle can prevent the lower portion of the deck cover from contacting the vehicle body when the large-sized deck cover is closed. Further, the present rear vehicle-body structure of the vehicle can keep a clearance (distance) between the vehicle body and the lower portion of the deck cover substantially constant, thereby preventing the vehicle's exterior appearance from deteriorating.

Additionally, since the position shift of the deck cover relative to the vehicle body is suppressed by the positioning mechanisms, the present rear vehicle-body structure of the vehicle can suppress a weight increase of a vehicle rear portion, compared with a case in which the mechanical strength of the link member is increased.

Thus, the present rear vehicle-body structure of the vehicle can properly suppress the position shift of the lower portion of the deck cover relative to the vehicle body by means of the positioning mechanism when the vertically-high and large-sized deck cover is closed.

In an embodiment of the present invention, the rear vehicle-body structure of the vehicle further comprises a pair of right-and-left pillar members provided to extend upward at both-side portions of the vehicle body which are positioned in front of the storage compartment and close to, in the vehicle longitudinal direction, respective front portions of the pair of right-and-left cover side wall portions, wherein the pair of right-and-left positioning mechanisms are arranged close to the pair of right-and-left pillar members.

According to this embodiment, the present rear vehicle-body structure of the vehicle can suppress the position shift of the deck cover relative to the vehicle body and the pillar member. Specifically, since the positioning mechanism is arranged close to the pillar member, the present rear vehicle-body structure of the vehicle can suppress the position shift of the deck cover relative to the pillar member, especially the position shift of the front portion of the cover shift wall portion.

Thus, the present rear vehicle-body structure of the vehicle can conduct the positioning of the deck cover relative to the vehicle body and the pillar member by means of the pair of right-and-left positioning mechanisms. Accordingly, the present rear vehicle-body structure of the vehicle can surely prevent the vehicle body and the pillar member from contacting the deck cover when the deck cover is closed.

Further, a clearance (distance) between the pillar member and the front portion of the cover side wall portion can be ensured stably, so the present rear vehicle-body structure of the vehicle can improve the vehicle's appearance. Additionally, in a case in which there is provided a seal member between the pillar member and the front portion of the cover side wall portion, for example, the present rear vehicle-body structure of the vehicle can ensure the sealing performance between the pillar member and the cover side wall portion.

Accordingly, the present rear vehicle-body structure of the vehicle can suppress the position shift of the deck cover relative to the vehicle body and the pillar member by means of the positioning mechanisms being arranged close to the pillar members.

In another embodiment of the present invention, the rear vehicle-body structure of the vehicle further comprises a storage mechanism provided to interconnect the storage member and the vehicle body and store the storage member into the storage compartment, wherein respective lower-portion sides of the pair of right-and-left cover side wall portions of the pair of right-and-left positioning mechanisms are configured as a pair of right-and-left cover-side positioning portions and respective vehicle-body sides of the pair of right-and-left positioning mechanisms are configured as a pair of right-and-left vehicle-body-side positioning portions, and the pair of right-and-left vehicle-body-side positioning portions, the storage mechanism, and the pillar members are integrally configured.

According to this embodiment, the present rear vehicle-body structure of the vehicle can improve assembling of the deck cover to the vehicle body and also suppress the position shift relative to surroundings properly. Specifically, in a case in which the vehicle-body-side positioning portion, the storage mechanism, and the pillar member are assembled to respective positions of the vehicle body which are different from each other, it is necessary to conduct respective position adjustments of the deck cover and the storage member relative to the vehicle body separately.

Meanwhile, the present rear vehicle-body structure of the vehicle in which the vehicle-body-side positioning portion, the storage mechanism, and the pillar member are configured as a unit can assemble these members, keeping their relative positions. Thus, it can be unnecessary to conduct the respective position adjustments of the deck cover and the storage member relative to the vehicle body separately.

Accordingly, the present rear vehicle-body structure of the vehicle can improve the assembling of the deck cover and the storage member to the vehicle body by integrally configuring the vehicle-body-side positioning portions, the storage mechanism, and the pillar members and also suppress the position shifts of the deck cover and the storage member.

In another embodiment of the present invention, each of the pair of right-and-left positioning mechanisms is provided with a vehicle-width-direction contact portion to contact in the vehicle width direction and a vertical-direction contact portion to contact in a vehicle vertical direction.

The vehicle-width-direction contact portion can be a portion where a vehicle-body side of the positioning mechanism and a deck-cover side of the positioning mechanism contact each other in the vehicle width direction. The vertical-direction contact portion can be a portion where the vehicle-body side of the poisoning mechanism and the deck-cover side of the poisoning mechanism contact each other in the vehicle vertical direction.

According to this embodiment, the present rear vehicle-body structure of the vehicle can regulate a vehicle-width-direction move and a vehicle-vertical-direction move of the deck cover, so that the deck cover in a closed state can be held stably. Specifically, the present rear vehicle-body structure of the vehicle can regulate the vehicle-width-direction move of the deck cover by the vehicle-width-direction contact portion of the positioning mechanism.

Accordingly, the present rear vehicle-body structure of the vehicle can prevent rattling (shaking) of the deck cover in the vehicle width direction which may be caused by traveling air or the like. Thus, the present rear vehicle-body structure of the vehicle can prevent that the lower portion of the deck cover and the vehicle body contact each other in the vehicle width direction.

Further, the present rear vehicle-body structure of the vehicle can regulate the vertical-direction move of the deck cover by the vertical-direction contact portion of the positioning mechanism. More specifically, in a case of the vertical-direction contact portion in which the deck-cover side of the positioning mechanism contacts the vehicle-body side of the positioning mechanism from below, for example, the present rear vehicle-body structure of the vehicle can regulate the upward move of the deck cover.

Accordingly, when the vehicle travels in a state in which the roof is stored in the storage compartment, for example, the present rear vehicle-body structure of the vehicle can prevent the deck cover from being raised due to the traveling air by regulating the upward move of the deck cover.

Or, in a case of the vertical-direction contact portion in which the deck-cover side of the positioning mechanism contacts the vehicle-body side of the positioning mechanism from above, for example, the present rear vehicle-body structure of the vehicle can regulate the downward move of the deck cover. Accordingly, even when a downward load is applied to the deck cover, for example, the present rear vehicle-body structure of the vehicle can prevent the lower portion of the deck cover from contacting the vehicle body.

Moreover, when the vehicle travels in the state in which the roof is stored in the storage compartment, for example, the present rear vehicle-body structure of the vehicle can prevent the deck cover from being raised due to the traveling air by applying a tensional load downward.

Accordingly, the present rear vehicle-body structure of the vehicle can prevent an unexpected load from being applied to the cover opening/closing mechanism and also prevent the deck cover from rattling (shaking) in the vehicle vertical direction.

That is, the present rear vehicle-body structure of the vehicle can concurrently conduct the vehicle-width-direction positioning and the vehicle-vertical-direction positioning surely by means of the pair of right-and-left positioning mechanisms. Thus, the present rear vehicle-body structure of the vehicle can prevent the rattling (shaking) of the deck cover when being closed with a properly simple structure, thereby suppressing any contact of the deck cover with the vehicle body surely.

Accordingly, since the positioning mechanism is provided with the vehicle-width-direction contact portion and the vertical-direction contact portion, the present rear vehicle-body structure of the vehicle can concurrently conduct the vehicle-width-direction positioning and the vehicle-vertical-direction positioning and also stably hold the deck cover being in the closed state.

In another embodiment of the present invention, the cover opening/closing mechanism comprises a cover link member which interconnects the deck cover and the vehicle body and a cover link drive portion which is fixedly attached to the vehicle body and rotates the cover link member, and the pair of right-and-left positioning mechanisms are arranged at a position which is spaced apart, in the vehicle longitudinal direction, from the cover link drive portion.

According to this embodiment, the present rear vehicle-body structure of the vehicle can surely suppress the position shift of the deck cover relative to the vehicle body. Specifically, since the opening/closing state of a portion of the deck cover which is located closer to an end portion of the deck cover, which is spaced apart from the cover link drive portion, becomes more unstable, there is a concern that the position shift of the end portion of the deck cover relative to the vehicle body may become improperly large when the deck cover is closed.

Therefore, the present rear vehicle-body structure of the vehicle can surely conduct the positioning of the portion of the deck cover whose opening/closing state may become unstable when the deck cover is closed by arranging the positioning mechanism at the position which is spaced apart, in the vehicle longitudinal direction, from the cover link drive portion.

Accordingly, the present rear vehicle-body structure of the vehicle can surely suppress the position shift of the deck cover relative to the vehicle body by arranging the positioning mechanism at the position spaced apart from the cover link drive portion.

Other features, aspects, and advantages of the present invention will become apparent from the following description which refers to the accompanying drawings.

DETAILED DESCRIPTION OF THE INVENTION

Figure 1:
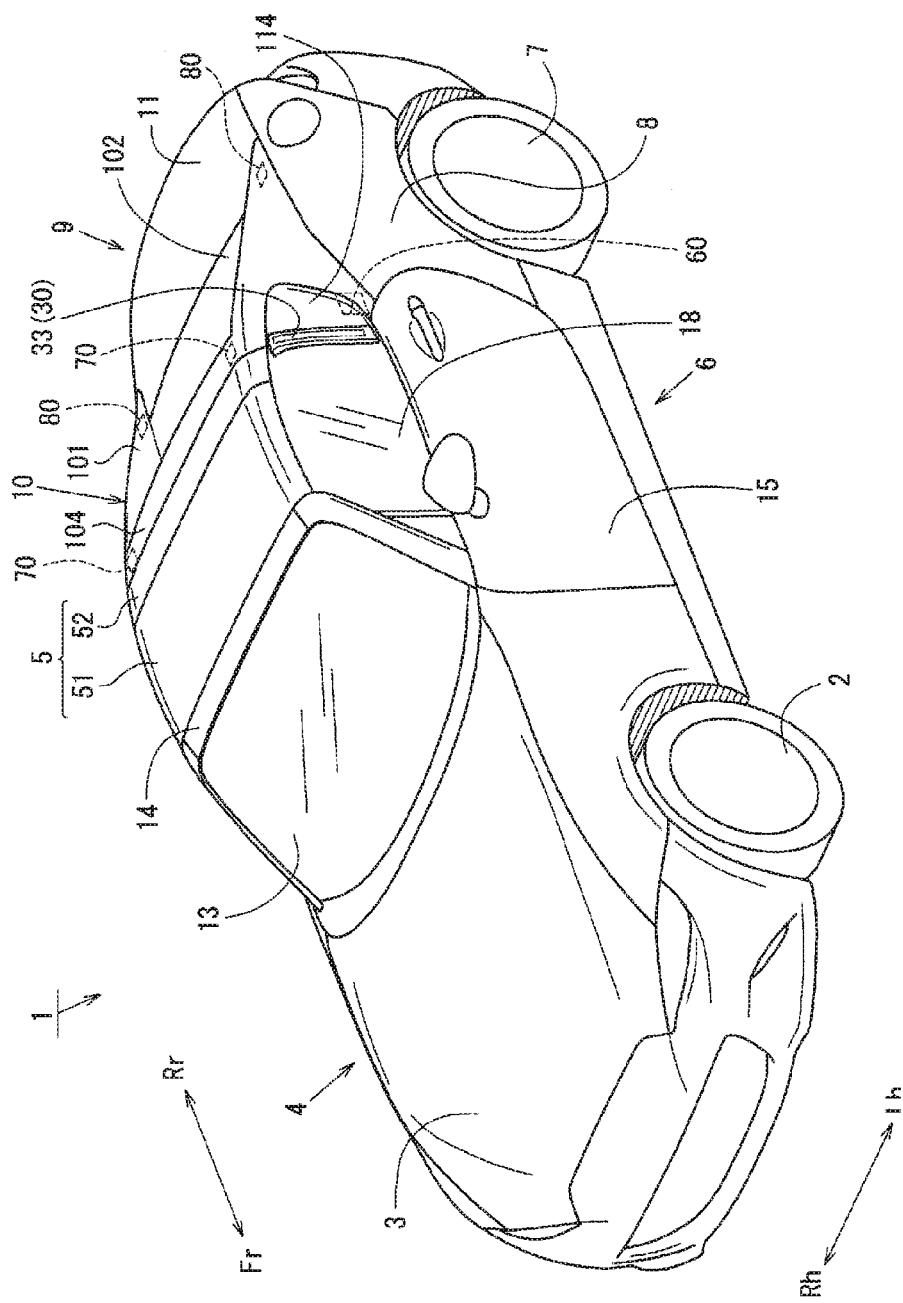
FIG. 1 is a perspective view showing an exterior of a vehicle in a state in which an openable roof is closed.

Hereafter, embodiments of the present invention will be described referring to the drawings.

Embodiment 1

Figure 2:
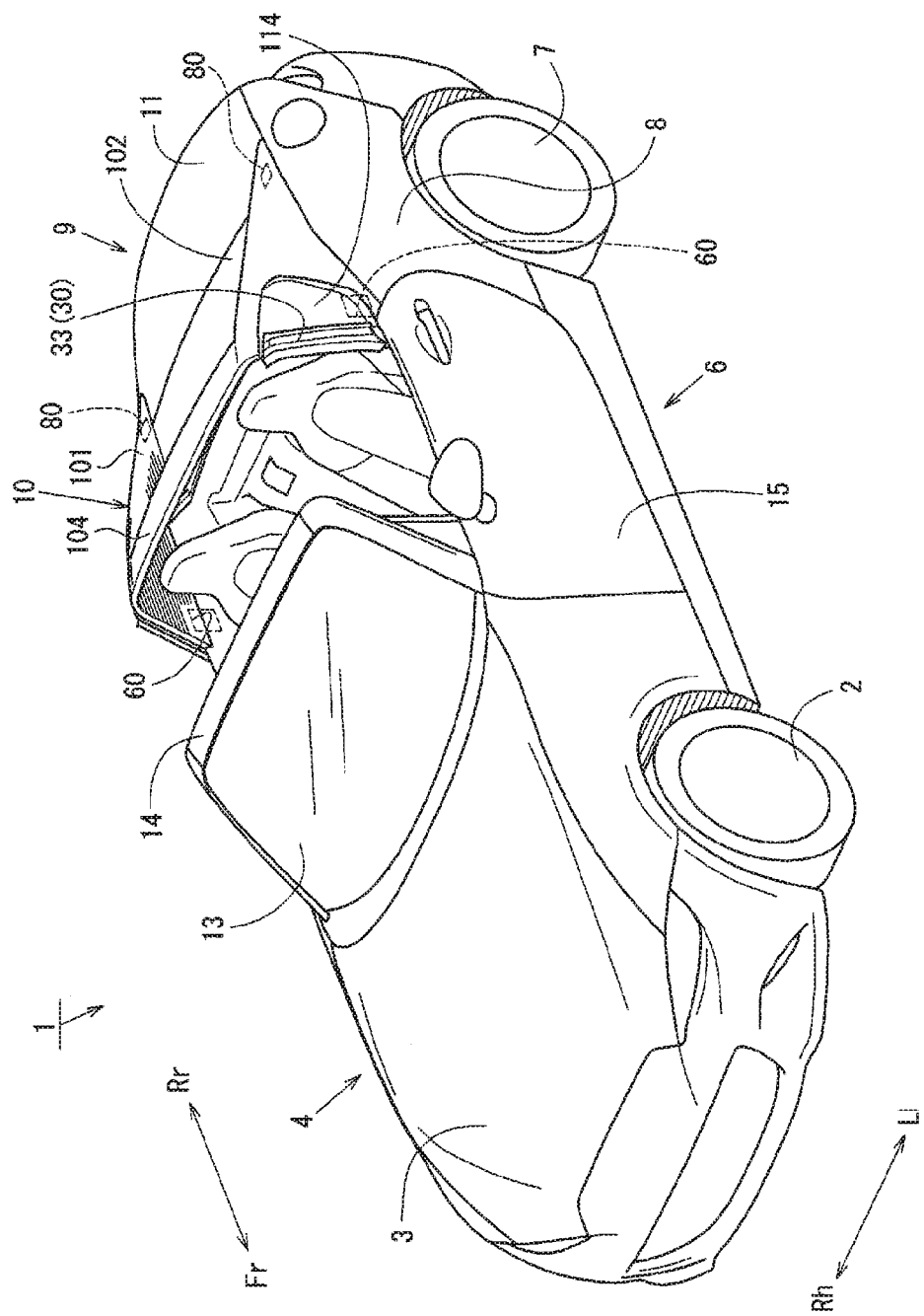
FIG. 2 is a perspective view showing the exterior of the vehicle in a state in which the openable roof is open.
Figure 3:
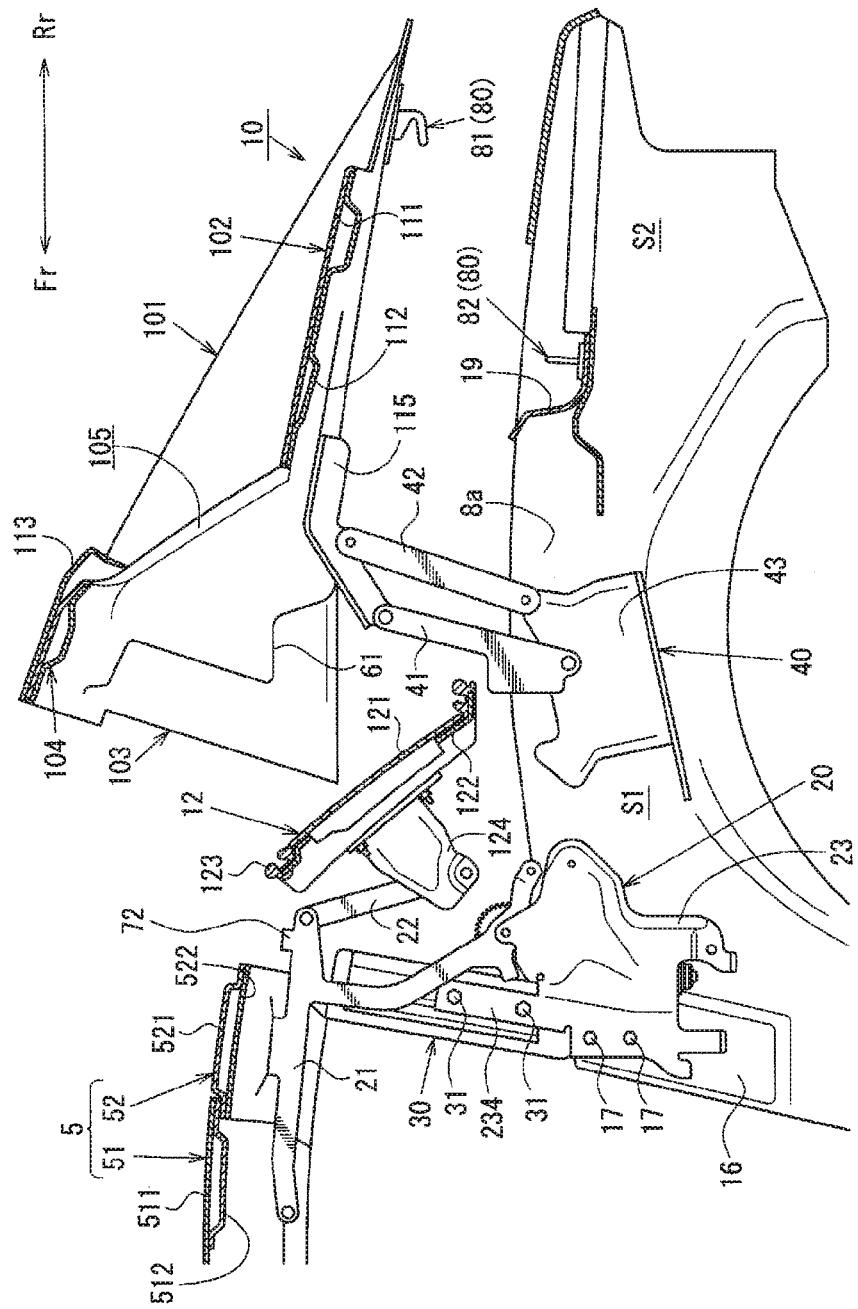
FIG. 3 is a side view showing an opening/closing mechanism in a state in which a deck cover is open, when viewed from vehicle inside.

A rear vehicle-body structure of a vehicle 1 according to a first embodiment will be specifically described referring to FIGS. 1 through 7. FIG. 1 is a perspective view showing an exterior of the vehicle 1 in a state in which an openable roof 5 is closed, FIG. 2 is a perspective view showing the exterior of the vehicle 1 in a state in which the openable roof 5 is open, and FIG. 3 is a side view showing an opening/closing mechanism in a state in which a deck cover 10 is open, when viewed from vehicle inside.

Figure 4:
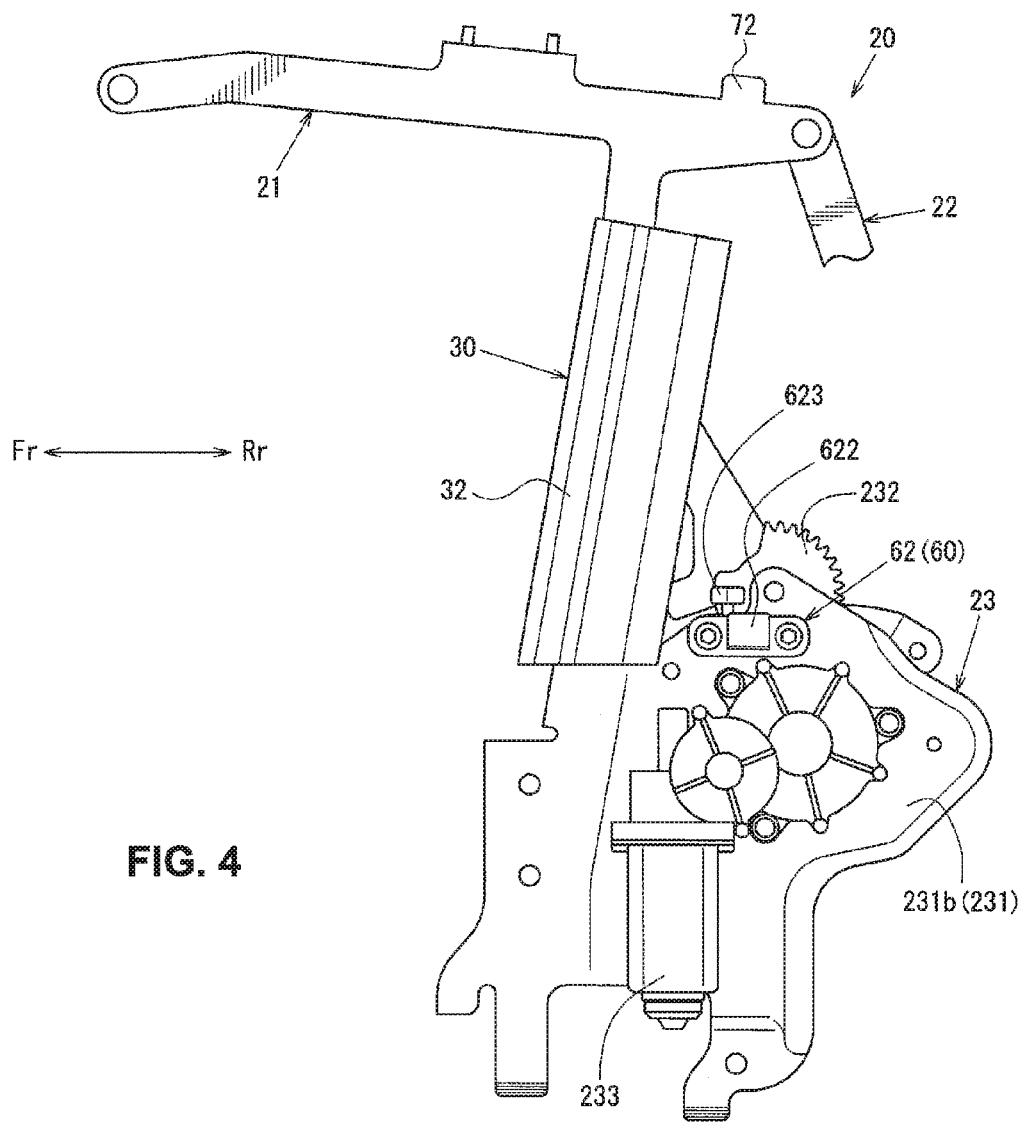
FIG. 4 is a side view showing a roof opening/closing mechanism, when viewed from vehicle outside.
Figure 5:
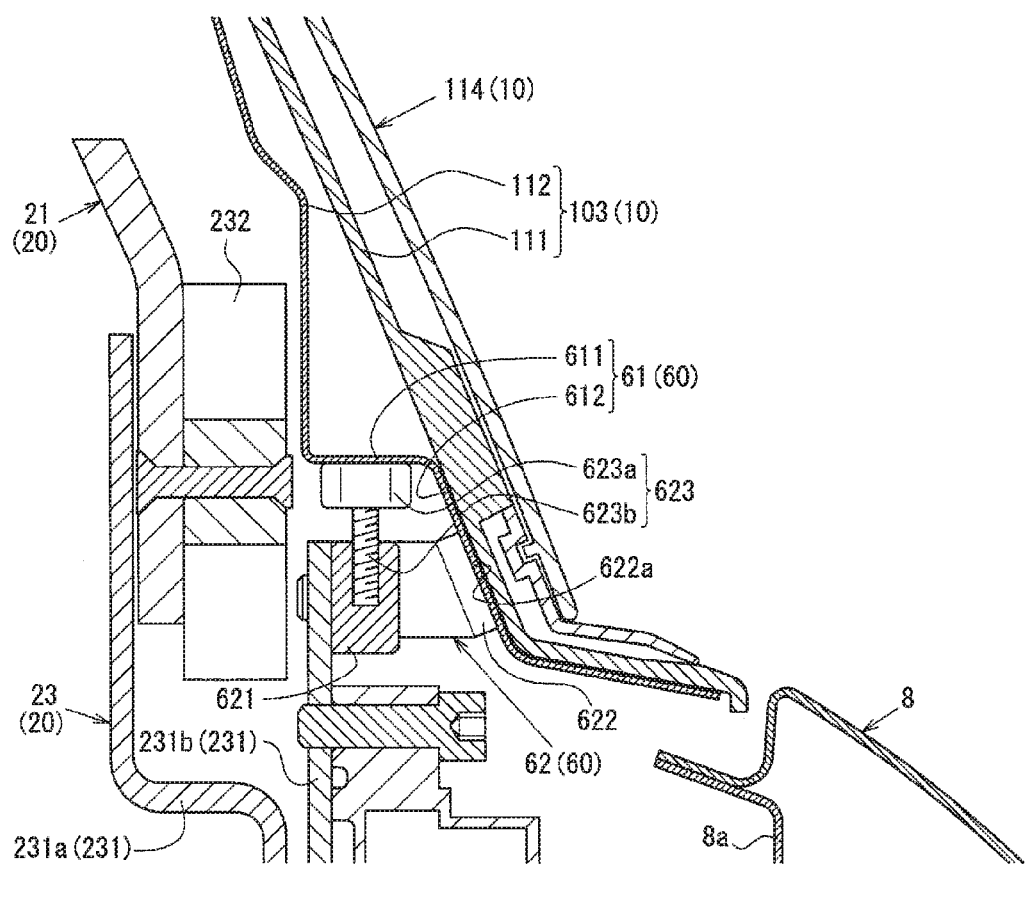
FIG. 5 is a sectional view of a front-lower regulation structure taken along a vehicle width direction.
Figure 6:
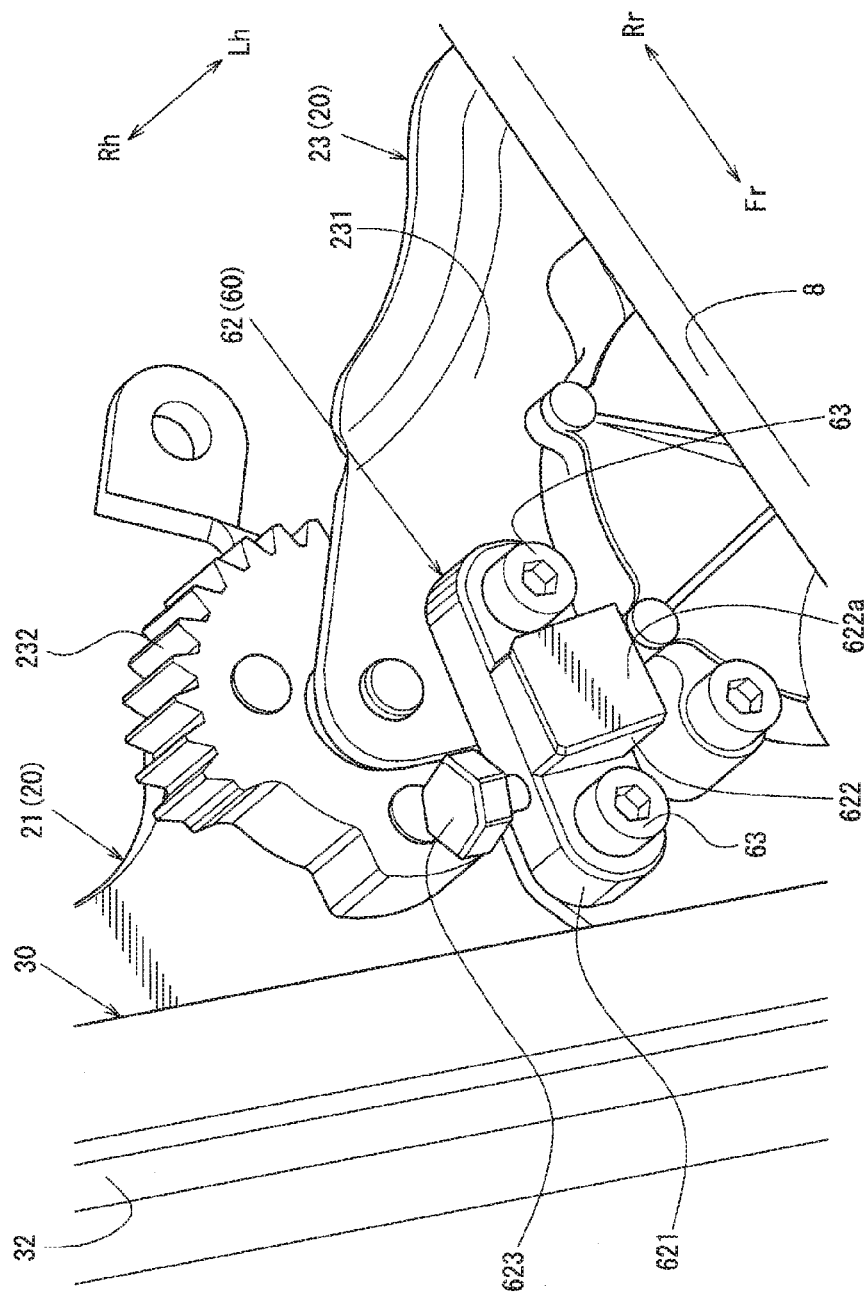
FIG. 6 is a major-part exterior perspective view showing a vehicle-body-side contact member, when viewed from the vehicle outside.
Figure 7:
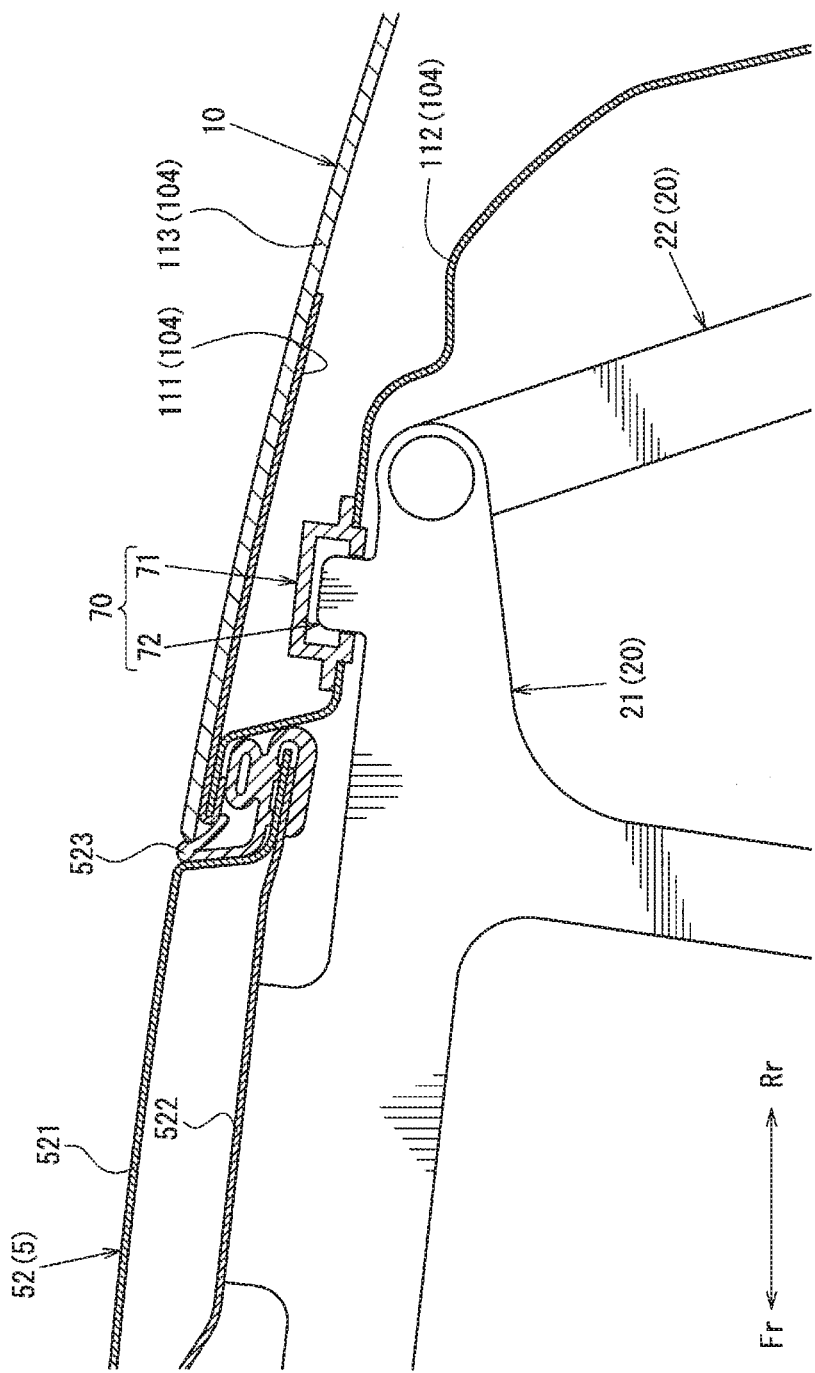
FIG. 7 is a sectional view of a front-upper regulation structure taken along a vehicle longitudinal direction.

Further, FIG. 4 is a side view showing a roof opening/closing mechanism 20, when viewed from vehicle outside, FIG. 5 is a sectional view of a front-lower regulation structure 60 taken along a vehicle width direction, FIG. 6 is a major-part exterior perspective view showing a vehicle-body-side contact member 62, when viewed from the vehicle outside, and FIG. 7 is a sectional view of a front-upper regulation structure 70 taken along a vehicle longitudinal direction.

In the figures, arrows Fr, Rr show the vehicle longitudinal direction, an arrow Fr shows a vehicle forward direction, and an arrow Rr shows a vehicle rearward direction. Further, arrows Rh, Lh show the vehicle width direction, an arrow Rh shows a vehicle rightward direction, and an arrow Lh shows a vehicle leftward direction. Additionally, an upper portion of FIG. 1 is a vehicle upper side and a lower portion of FIG. 1 is a vehicle lower side.

First, the vehicle 1 of the present embodiment comprises, as shown in FIGS. 1 and 2, a vehicle front portion 4 where front wheels 2 and an engine hood (bonnet) 3 are arranged, a cabin portion 6 which is covered with an openable roof 5 at its upper portion and accommodates a passenger therein, and a vehicle rear portion 9 where rear wheels 7 and a pair of right-and-left rear fenders 8 are arranged, which are arranged in this order from a vehicle front side.

Further, as shown in FIG. 3, the vehicle rear portion 9 includes a storage portion (not illustrated) on a vehicle front side between the pair of right-and-left rear fenders 8. The above-described storage portion comprises a storage compartment S1, an upper portion of which opens upward, and a deck cover 10 which covers over the storage compartment S1.

Additionally, as shown in FIG. 3, the vehicle rear portion 9 includes a baggage-room portion (not illustrated) on a vehicle rear side between the pair of right-and-left rear fenders 8, i.e., in back of the above-described storage compartment S1. This baggage-room portion comprises a baggage-room compartment S2, an upper portion of which opens upward, and a trunk lid 11 which covers over the baggage-room compartment S2.

The vehicle 1 is, as shown in FIGS. 1 through 3, a so-called open car, in which the openable roof 5 covering over the cabin portion 6 and a back window portion 12 positioned in back of the cabin portion 6 are storable in the storage compartment S1.

More specifically, the openable roof 5 comprises a front roof 51 which is positioned on a front side of the upper portion of the cabin roof 6 and a rear roof 52 which is positioned behind the front roof 51, as shown in FIGS. 2 through 3.

The front roof 51 has a longitudinal length that is more than a half of the upper portion of the cabin portion 6, and comprises an upper panel 511 which provides an exterior design face of a vehicle body and a lower panel 512 which faces, in a vehicle vertical direction, the upper panel 511, which are integrally joined together. A front end of the front roof 51 is configured to be detachable to an upper portion of a front window frame member 14 which supports a windshield glass 13.

The rear roof 52 is provided such that its front end is positioned close to the front roof 51 and has a size such that its rear end is positioned close to the deck cover 10 (a cover header portion 104 of the deck cover 10, which will be specifically described later), and comprises an upper panel 521 which provides another exterior design face of the vehicle body and a lower panel 522 which faces, in the vehicle vertical direction, the upper panel 521, which are integrally joined together.

Herein, a synthetic rubber-made seal member (not illustrated) is attached to a front end of the rear roof 52 so as to close a gap between the seal member and the front roof 51, and a synthetic rubber-made seal member 523 (see FIG. 7) is attached to a rear end of the rear roof 52 so as to close a gap between the seal member 523 and the deck cover 10.

The back window portion 12 comprises, as shown in FIG. 3, a transparent back window glass 121, a back window frame member 122 which supports the back window glass 121, and a window seal member 123 which is attached along an outer periphery of the back window frame member 122. Further, a pair of right-and-left brackets 124 which are provided on both sides, in the vehicle width direction, of the vehicle body to connect to a roof opening/closing mechanism 20, which will be specifically described later, are fixedly attached to a front-face side of the back window frame member 122.

The vehicle 1 equipped with the opening/closing roof 5 and the back window portion 12 is configured such that storing of the openable roof 5 and the back window portion 12 in the storage compartment S1 and deploying (expanding) of the openable roof 5 and the back window portion 12 are achieved by the roof opening/closing mechanism 20.

The roof opening/closing mechanism 20 comprises, as shown in FIG. 3, plural roof link members which support the openable roof 5 and the back window portion 12 and a pair of right-and-left roof link drive portions 23 which rotate the plural roof link members. Herein, any structure can be applied as the above-described plural roof link members as long as the openable roof 5 and the back window portion 12 are storable in the storage compartment S1. The present embodiment merely discloses one example.

The above-described plural roof link members comprise a pair of right-and-left first roof links 21 which connect the rear roof 52 of the openable roof 5 and the roof link drive portions 23, a pair of right-and-left second roof links 22 which connect rear ends of the first roof links 21 and the back window portion 12, and a pair of right-and-left third roof links (not illustrated) which connect front ends of the first roof links 21 and the front roof 51 of the openable roof 5, for example.

The first roof link 21 is a link member which is of a roughly T shape in the side view, a portion of the first roof link 21 which extends in the vehicle longitudinal direction is fixedly fastened to an outward end portion, in the vehicle width direction, of the rear roof 52, and a lower end of a portion of the first roof link 21 which extends in the vehicle vertical direction is connected to the roof link drive portion 23.

The second roof link 22 is a link member which is of a roughly belt shape in the side view, a front end of the second roof link 22 is pivotally connected to a rear end of the first roof link 21, and a rear end of the second roof link 22 is pivotally connected to the bracket 124 of the back window portion 12. One end of the third roof link is pivotally connected to an upper portion of the first roof link 21, and the other end is fixedly fastened to the front roof 51.

The roof link drive portion 23 is fixedly fastened to an inner pillar panel 16 which forms an opening edge of a door 15 (see FIG. 1) by using a fastening bolt 17 on an inside of the cabin portion 6.

The roof link drive portion 23 is, as shown in FIGS. 4 and 5, configured to store a large-diameter gear 232 which is coupled to the first roof link 21 and rotatably supported, plural drive gear sets (not illustrated) which are engaged with the large-diameter gear 232 and rotatably supported, and others in a housing 23. Herein, the housing 23 is formed by an inner housing 231a positioned on an inward side of the vehicle and an outer housing 231b positioned on an outward side of the vehicle.

Further, an electric motor 233 to drive the drive gear sets is arranged at the outer housing 231b. Herein, the electric motor 233 is controlled so that driving of the pair of right-and-left roof link drive portions 23 can be synchronized.

Additionally, the inner housing 231a is provided with a housing extension portion 234 which extends upward from its front upper end as shown in FIG. 3. A pillar member 30 which is provided between a door glass 18 (see FIG. 1) and the deck cover 10 is fixedly fastened to the housing extension portion 234 with a fastening bolt 31.

The pillar member 30 comprises, as shown in FIGS. 3 and 4, a pillar core member (not illustrated) which is fixedly fastened to the housing extension portion 234, a synthetic rubber-made pillar seal member 32 which is provided at the pillar core member and closes a gap between the door glass 18 and the deck cover 10, and a pillar garnish 33 (see FIG. 1) which forms the exterior design face of the vehicle 1.

The roof opening/closing mechanism 20 described above moves the openable roof 5 and the back window portion 12 in a folded state and stores these in the storage compartment S1. Specifically, in response to an operation of a passenger who wants to store the openable roof 5 and the back window portion 12 in the storage compartment S1, the roof opening/closing mechanism 20 drives the electric motor 233 of the roof link drive portion 23 and starts to rotates the first roof link 21 rearward. Herein, the second roof link 22 and the third roof link start to rotate in interlocking with a rotation of the first roof link 21.

The roof opening/closing mechanism 20 rotates the rear roof 52 forward and downward so that a lower face of the front roof 51 and a lower face of the rear roof 52 face each other in the vehicle vertical direction. Further, the roof opening/closing mechanism 20 rotates the back window portion 12 such that a front-face side of the back window portion 12 looks upward and moves below the folded rear roof 52.

The roof opening/closing mechanism 20 moves the openable roof 5 and the back window portion 12 into the storage compartment S1, folding the openable roof 5 and the back window portion 12. The storage compartment S1 is configured such that it has an opening at its upper side which is larger, in the plan view, than the front roof 51 of the openable roof 5 and also has an inside space which is large enough to store the folded openable roof 5 and the back window portion 12.

Meanwhile, as shown in FIGS. 1 through 3, the deck cover 10 covering over the opening of the storage compartment S1 comprises a pair of right-and-left cover protrusion portions 101 which are configured to be continuous from the rear fender 8 and protrude upward in a crest shape in the front view, a cover flat face portion 102 which interconnects respective lower portions of the cover protrusion portions 101 and configured to be continuous from the trunk lid 11, a pair of right-and-left cover side wall portions 103 which extend forward on the vehicle outside at the cover protrusion portions 101 and configured such that their front ends are positioned close to the respective pillar members 30, and a cover header portion 104 which interconnects respective upper ends of the cover side wall portions 103 and is configured such that its front end is positioned close to the rear roof 52, which are integrally formed so as to shape the deck cover 10 in a gate shape in the front view.

The deck cover 10 is also configured to have a window opening portion 105 where the back window portion 12 is detachably provided. This window opening portion 105 is an opening which is formed between, in the vehicle vertical direction, the cover flat face portion 102 and the cover header portion 104 and between, in the vehicle width direction, the right-and-left cover protrusion portions 101.

As shown in FIG. 3, the deck cover having the above-described shape is made by assembling a metal-made cover outer panel 111 which forms the exterior design face of the vehicle 1 and a synthetic-resign-made cover inner panel 112 which is configured to cover an inside of the cover outer panel 111.

Further, a header garnish 113 which forms the exterior design face of the vehicle 1 and is formed separately from the cover outer panel 111 is attached to the cover header portion 104 such that it covers over the cover outer panel 111. Additionally, a side garnish 113 (see FIGS. 1 and 5) which has a triangular shape in the side view is attached to a vehicle-outside front portion of the cover outer panel 111 of the cover side wall portion 103.

The vehicle 1 equipped with the above-described deck cover 10 is configured such that opening of the storage compartment S1 by moving the deck cover 10 to an upper position of the vehicle and closing of the storage compartment S1 by moving the deck cover 10 to a lower position of the vehicle can be achieved by a pair of right-and-left cover opening/closing mechanisms 40.

The cover opening/closing mechanisms 40 comprises, as shown in FIG. 3, a pair of right-and-left front cover links 41 and a pair of right-and-left rear cover links 42 which support the deck cover 10 together a pair of right-and-left cover link drive portions 43 which rotate the front cover links 41.

The front cover link 41 is configured in a roughly belt shape, in the side view, extending in the vehicle vertical direction such that its upper end is pivotally connected to a front end of a cover bracket 115 which is provided at the lower portion of the deck cover 10 and its lower end is connected to the cover link drive portion 43.

The rear cover link 42 is configured in the roughly belt shape, in the side view, extending in the vehicle vertical direction such that its upper end is pivotally connected to the cover bracket 115 of the deck cover 10 and its lower end is connected to the cover link drive portion 43. The rear cover link 42 is positioned in back of the front cover link 41.

Herein, the cover bracket 115 of the deck cover 10 is fixedly fastened to a reinforcing member which is provided at the cover outer panel 111 via the cover inner panel 112 substantially at the same position, in the vehicle longitudinal direction, as the window opening portion 105. The cover link drive portion 43 is fixedly fastened to a fender inner panel 8a which forms a vehicle-inside portion of the rear fender 8.

More specifically, the cover link drive portion 43 is configured such that its connection point to the front cover link 41 is positioned in front of a connection point of the cover bracket 115 and the front cover link 41, and the cover link drive portion 43 is fixedly fastened at a position which is spaced rearward apart from the roof opening/closing mechanism 20.

The cover link drive portion 43 comprises a large-diameter gear (not illustrated) which is connected to the front cover link 41 and pivotally supported, plural drive gear sets (not illustrated) which are engaged with the large-diameter gear and pivotally supported, a housing which accommodate these, an electric motor (not illustrated) which rotates the drive gear sets, and others.

Further, to a rear end of an upper portion of the cover link drive portion 43 is pivotally connected a lower end of the rear cover link 42. That is, the cover opening/closing mechanism 40 forms a four-joint link structure in which the front cover link 41 is a drive link and the rear cover link 42 is an dependent (driven) link.

Subsequently, positioning mechanisms to regulate the position of the deck cover 10 relative to the vehicle body in a state in which the above-described deck cover 10 is closed will be described specifically. First, as shown in FIG. 1, the vehicle 1 is provided with a pair of right-and-left front-lower regulation structures 60 which regulate the position of a front lower portion of the deck cover 10 as a first positioning mechanism.

Further, there are provided a pair of right-and-left front-upper regulation structures 70 which regulate the position of a front upper portion of the deck cover 10 as a second positioning mechanism and a pair of right-and-left rear regulation structures 80 which regulate the position of a rear portion of the deck cover 10 as a second positioning mechanism.

Each of the pair of right-and-left front-lower regulation structures 60 of the first positioning mechanism comprises, as shown in FIGS. 4 and 5, a cover-side contact portion 61 which is a recess portion formed at the cover inner panel 112 of the deck cover 10 and a vehicle-body-side contact member 62 which is fixedly fastened to the roof link drive portion 23.

The cover-side contact portion 61 comprises, as shown in FIG. 5, a cover flat-face portion 611 which is configured such that the cover inner panel 112 bends outward substantially at the right angle from its specified vertical position and a cover slant portion 612 which is configured to slant downward and outward from an outward end of the cover flat-face portion 611, which are formed integrally.

The vehicle-body-side contact member 62 is fixedly fastened to an upper portion of the outer housing 231b of the roof link drive portion 23 which is positioned reward close to the pillar member 30 as shown in FIG. 4.

This vehicle-body-side contact member 62 comprises, as shown in FIGS. 5 and 6, a body portion 621 which is fixed to the outer housing 231b, a vehicle-width-direction regulation portion 622 which contacts the cover slant portion 612 of the cover-side contact portion 61 in the vehicle width direction, and a vertical-direction regulation portion 623 which contacts the cover flat-face portion 611 of the cover-side contact portion 61 in the vehicle vertical direction.

The body portion 621 has a specified thickness in the vehicle width direction and is of a roughly longitudinal-long oval shape in the side view. The body portion 621 has, at its both ends, opening holes (not illustrated) for insertion of fastening bolts 63 engaged with the roof link drive portion 23.

The vehicle-width-direction regulation portion 622 is, as shown in FIGS. 5 and 6, a pole-shaped body which protrudes outward from a central portion, in the vehicle longitudinal direction, of the body portion 621, and is formed integrally with the body portion 621.

An end face of an outward side of the vehicle-width-direction regulation portion 622 slants such that its lower end is positioned on the outward side relative to its upper end, and is formed as a contact face 622a which contacts the cover slant portion 612 of the cover-side contact portion 61 in the vehicle width direction in the state in which the deck cover 10 is closed.

The vertical-direction regulation portion 623 comprises, as shown in FIGS. 5 and 6, a bolt head portion 623a which has a roughly hexagon shape in the plan view and which the cover flat-face portion 611 of the cover-side contact portion 61 contacts, and a bolt shaft portion 623b which has screw threads on its periphery, and the vertical-direction regulation portion 623 is of a hexagon-bolt shape. This vertical-direction regulation portion 623 is configured to be screwed into a screw hole (not illustrated) which is formed at a vehicle front portion of the body portion 621.

The vertical-direction regulation portion 623 is screwed into the screw hole such that the cover flat-face portion 611 of the cover-side contact portion 61 and the bolt head portion 623a contact each other so as to provide a specified distance, in the vehicle vertical direction, between the lower end of the deck cover and the vehicle body.

Each of the front-upper regulation structures 70 as the second positioning mechanism, which is provided above the front-lower regulation structure 60, comprises, as shown in FIG. 7, an engagement member 71 which is provided at the deck cover 10 and a link protrusion portion 72 which is provided at the first roof link 21.

The engagement member 71 is configured in a boxy shape such that its lower side opens with an open size which is large enough to allow the link protrusion portion 72 to pass therein. This engagement member 71 is fixed to the cover inner panel 112 of the cover header portion 104 by a fixing means.

The link protrusion portion 72 is a member having a roughly rectangular flat-plate shape in the side view which engages with the engagement member 71, and is formed integrally with the first roof link 21. More specifically, the link protrusion portion 72 is formed integrally with an upper end portion of the first roof link 21 which vertically faces the opening of the engagement member 71.

Each of the rear regulation structures 80 as the third positioning mechanism comprises, as shown in FIG. 3, a hook portion 81 which is provided at a lower face of a rear portion of the deck cover 10 and a striker portion 82 which is provided at a front portion of the cabin portion. The hook portion 81 is provided at a lower face of a rear end of the cover protrusion portion 101 and formed in a hook shape having an opening at its front side.

The striker portion 82 comprises a striker (not illustrated) which is formed in a roughly gate shape in the front view by bending a metal-made pole-shaped member, and is arranged in front of an opening edge portion 19 which forms an opening edge of the baggage-room portion.

The rear regulation structure 80 is a lock device in which locking of the hook portion 81 with the striker portion 82 and unlocking of these members are electrically conducted in response to a passenger's opening/closing operation of the openable roof 5.

The rear vehicle-body structure of the vehicle 1 described above can suppress the position shift of the lower portion of the deck cover 10 relative to the vehicle body when the vertically-high and large-sized deck cover 10 is closed.

Specifically, the present rear vehicle-body structure of the vehicle 1 can properly suppress the position shift of the deck cover 10 relative to the vehicle body, especially the respective shift positions of the lower portions of the cover side wall portions 103, by means of the pair of right-and-left front-lower regulation structures 60 to regulate the positions of the lower portions of the cover side wall portions 103 relative to the vehicle body.

Accordingly, the present rear vehicle-body structure of the vehicle 1 can prevent the lower portion of the deck cover 10 from contacting the vehicle body when the large-sized deck cover 10 is closed. Further, the present rear vehicle-body structure of the vehicle 1 can keep a clearance (distance) between the vehicle body and the lower portion of the deck cover 10 substantially constant, thereby preventing the exterior appearance of the vehicle 1 from deteriorating.

Additionally, since the position shift of the deck cover 10 relative to the vehicle body is suppressed by the front-lower regulation structures 60, the present rear vehicle-body structure of the vehicle 1 can suppress a weight increase of the vehicle rear portion 9, compared with a case in which the mechanical strength of the front cover link 41 and the rear cover link 42 is increased.

Thus, the present rear vehicle-body structure of the vehicle 1 can properly suppress the position shift of the lower portion of the deck cover 10 relative to the vehicle body by means of the front-lower regulation structures 60 when the vertically high and large-sized deck cover 10 is closed.

Further, since the front-lower regulation structures 60 are arranged close to the pillar members 30, the vehicle-body structure of the vehicle 1 can suppress the position shift of the deck cover 10 relative to the vehicle body and the pillar members 30.

Specifically, since the front-lower regulation structures 60 are arranged close to the pillar members 30, the present rear vehicle-body structure of the vehicle 1 can suppress the position shift of the deck cover 10 relative to the pillar members 30, especially the position shift of the front portion of the cover shift wall portions 103.

Thus, the present rear vehicle-body structure of the vehicle 1 can conduct the positioning of the deck cover 10 relative to the vehicle body and the pillar member 30 by means of the pair of right-and-left front-lower regulation structures 60. Accordingly, the present rear vehicle-body structure of the vehicle 1 can surely prevent the vehicle body and the pillar members 30 from contacting the deck cover 10 when the deck cover 10 is closed.

Further, a clearance (distance) between the pillar member 30 and the front portion of the cover side wall portion 103 can be ensured stably, so the present rear vehicle-body structure of the vehicle 1 can improve the vehicle's appearance. Additionally, since the pillar seal member 32 can be stably pressed by the deck cover 10, the present rear vehicle-body structure of the vehicle 1 can ensure the sealing performance between the pillar member 30 and the cover side wall portion 103.

Accordingly, the present rear vehicle-body structure of the vehicle 1 can suppress the position shift of the deck cover 10 relative to the vehicle body and the pillar members 30 by means of the front-lower regulation structures 60 being arranged close to the pillar members 30.

Also, since the vehicle-body-side contact member 62, the roof link drive portion 23, and the pillar member 30 are integrally configured, the present rear vehicle-body structure of the vehicle 1 can improve assembling of the deck cover 10 to the vehicle body and also suppress the position shift relative to surroundings properly.

Specifically, in a case in which the vehicle-body-side contact member 62, the roof link drive portion 23, and the pillar member 30 are assemble to respective positions of the vehicle body which are different from each other, it is necessary to conduct respective position adjustments of the deck cover 10, the openable roof 5, and the back window portion 12 relative to the vehicle body separately.

Meanwhile, the present rear vehicle-body structure of the vehicle 1 in which the vehicle-body-side contact member 62, the roof link drive portion 23, and the pillar member 30 are configured as a unit can assemble these members, keeping their relative positions.

Thus, it can be unnecessary to conduct the respective position adjustments of the deck cover 10, the openable roof 5, and the back window portion 12 relative to the vehicle body separately in the rear vehicle-body structure of the vehicle 1.

Accordingly, the present rear vehicle-body structure of the vehicle 1 can improve the assembling of the deck cover 10, the openable roof 5, and the back window portion 12 to the vehicle body by integrally configuring the vehicle-body-side contact member 62, the roof link drive portion 23, and the pillar member 30 and also suppress the position shifts of the deck cover 10, the openable roof 5, and the back window portion 12.

Moreover, since the front-lower regulation structure 60 is configured such that the cover slant portion 612 and the vehicle-width-direction regulation portion 622 contact each other in the vehicle width direction and the cover flat-face portion 611 and the vertical-direction regulation portion 623 contact each other in the vehicle vertical direction, the present rear vehicle-body structure of the vehicle 1 can regulate a vehicle-width-direction move and a vehicle-vertical-direction move of the deck cover 1, so that the deck cover 10 in the closed state can be stably held.

Specifically, the present rear vehicle-body structure of the vehicle 1 can regulate the vehicle-width-direction move of the deck cover 10 by means of the front-lower regulation structure 60 being configured such that the cover slant portion 612 contacts the contact face 622a of the vehicle-width-direction regulation portion 622.

Accordingly, the present rear vehicle-body structure of the vehicle 1 can prevent rattling (shaking) of the deck cover 10 in the vehicle width direction which may be caused by traveling air or the like. Thus, the present rear vehicle-body structure of the vehicle 1 can prevent that the lower portion of the deck cover 10 and the vehicle body contact each other in the vehicle width direction.

Further, the present rear vehicle-body structure of the vehicle 1 can regulate the vertical-direction move of the deck cover 10 by means of the front-lower regulation structure 60 being configured such that the cover flat-face portion 611 contacts the vertical-direction regulation portion 623.

More specifically, since the cover flat-face portion 611 of the cover-side contact portion 61 contacts the vertical-direction regulation portion 623 of the vehicle-body-side contact member 62 from above, the present rear vehicle-body structure of the vehicle 1 can regulate the downward move of the deck cover 10.

Accordingly, even when a downward load is applied to the deck cover 10, for example, the present rear vehicle-body structure of the vehicle 1 can prevent the lower portion of the deck cover 10 from contacting the vehicle body.

Moreover, when the vehicle 1 travels in the state in which the openable roof 5 is stored in the storage compartment S1, the present rear vehicle-body structure of the vehicle 1 can prevent the deck cover 10 from being raised due to the traveling air by applying a tensional load downward by means of the cover opening/closing mechanism 40.

Accordingly, the present rear vehicle-body structure of the vehicle 1 can prevent an unexpected load from being applied to the cover opening/closing mechanism 40 and also prevent the deck cover 10 from rattling (shaking) in the vehicle vertical direction.

That is, the present rear vehicle-body structure of the vehicle 1 can concurrently conduct the vehicle-width-direction positioning and the vehicle-vertical-direction positioning surely by means of the pair of right-and-left front-lower regulation structures 60. Thus, the present rear vehicle-body structure of the vehicle 1 can prevent the rattling (shaking) of the deck cover 10 when being closed with a properly simple structure, thereby suppressing any contact of the deck cover 10 with the vehicle body surely.

Accordingly, the present rear vehicle-body structure of the vehicle 1 can concurrently conduct the vehicle-widthdirection positioning and the vehicle-vertical-direction positioning and also stably hold the deck cover 10 being in the closed state.

Further, since the front-lower regulation structure 60 is arranged at a position which is spaced apart, in the vehicle longitudinal direction, from the cover link drive portion 43 of the cover opening/closing mechanism 40, the present rear vehicle-body structure of the vehicle 1 can surely suppress the position shift of the deck cover 10 relative to the vehicle body.

Specifically, since the opening/closing state of a portion of the deck cover 10 which is located closer to an end portion of the deck cover 10, which is spaced apart from the cover link drive portion 43, becomes more unstable, there is a concern that the position shift of the end portion of the deck cover 10 relative to the vehicle body may become improperly large when the deck cover 10 is closed.

Therefore, since the front-lower regulation structure 60 is arranged at the position which is spaced apart, in the vehicle longitudinal direction, from the cover link drive portion 43 of the cover opening/closing mechanism 40, the present rear vehicle-body structure of the vehicle 1 can surely conduct the positioning of the portion of the deck cover whose opening/closing state may become unstable when the deck cover 10 is closed.

Accordingly, the present rear vehicle-body structure of the vehicle 1 can surely suppress the position shift of the deck cover 10 relative to the vehicle body by arranging the front-lower regulation structure 60 at the position spaced apart from the cover link drive portion 43.

Moreover, since the pair of right-and-left front-upper regulation structures 70 and the pair of right-and-left rear regulation structures 80 are provided additionally to the pair of right-and-left front-lower regulation structures 60, the present rear vehicle-body structure of the vehicle 1 can conduct the positioning of the deck cover 10 relative to the vehicle body at plural points.

That is, the present rear vehicle-body structure of the vehicle 1 can suppress the position shift of the lower portion of the deck cover 10 by means of the front-lower regulation structures 60, suppress the position shift of the upper portion of the deck cover 10 by means of the front-upper regulation structures 70, and suppress the position shift of the rear portion of the deck cover 10 by means of the rear regulation structures 80.

Accordingly, the present rear vehicle-body structure of the vehicle 1 can surely suppress the position shift of the deck cover 10 relative to the vehicle body with a combination of the pair of right-and-left front-lower regulation structures 60, the pair of right-and-left front-upper regulation structures 70, and the pair of right-and-left rear regulation structures 80.

Embodiment 2

Next, a rear vehicle-body structure of the vehicle according to a second embodiment, in which the structure of the front-lower regulation structure as the first positioning mechanism is different from the above-described first embodiment, will be described specifically referring to FIGS. 8 through 10.

Figure 8:
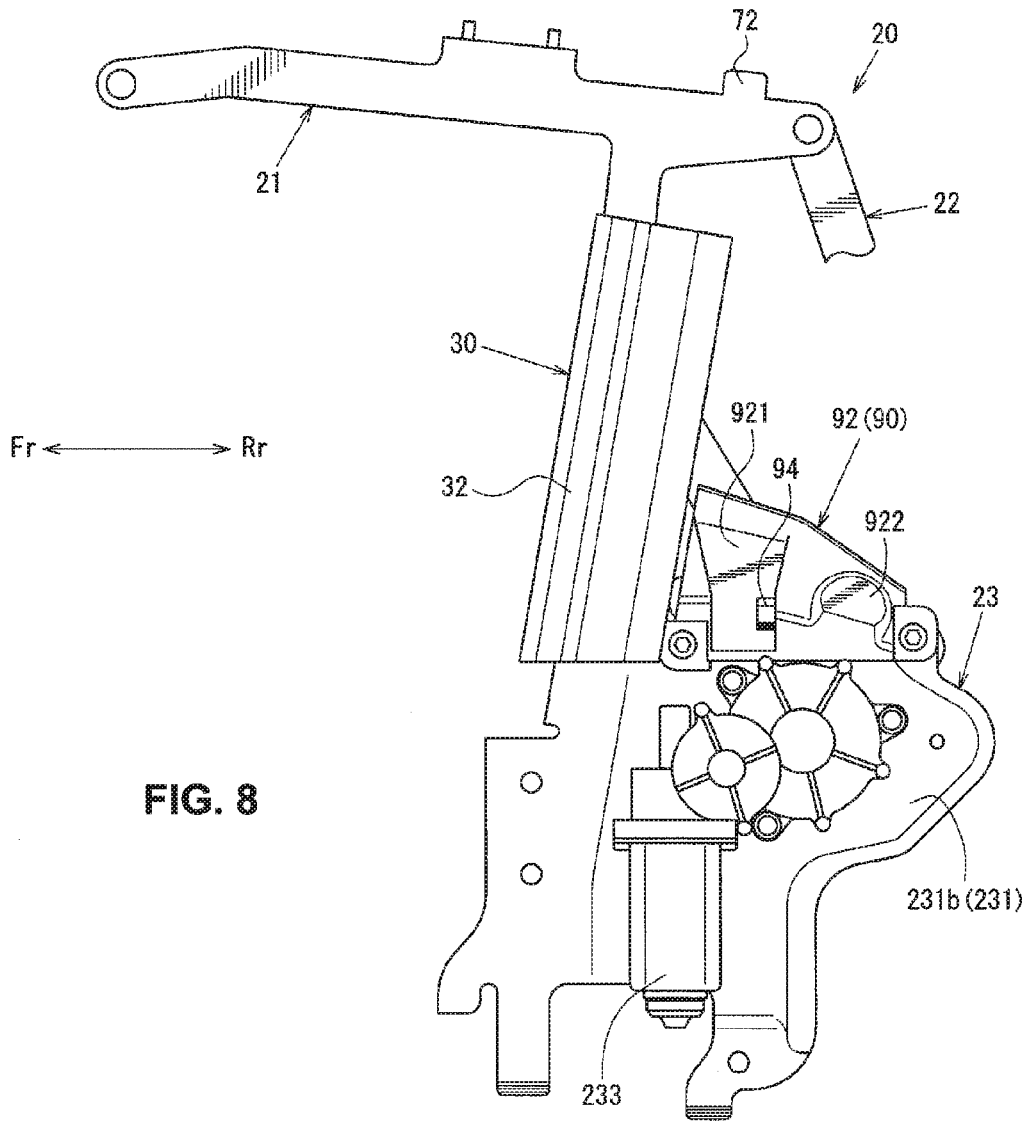
FIG. 8 is a side view showing a roof opening/closing mechanism according to a second embodiment, when viewed from the vehicle outside.
Figure 9:
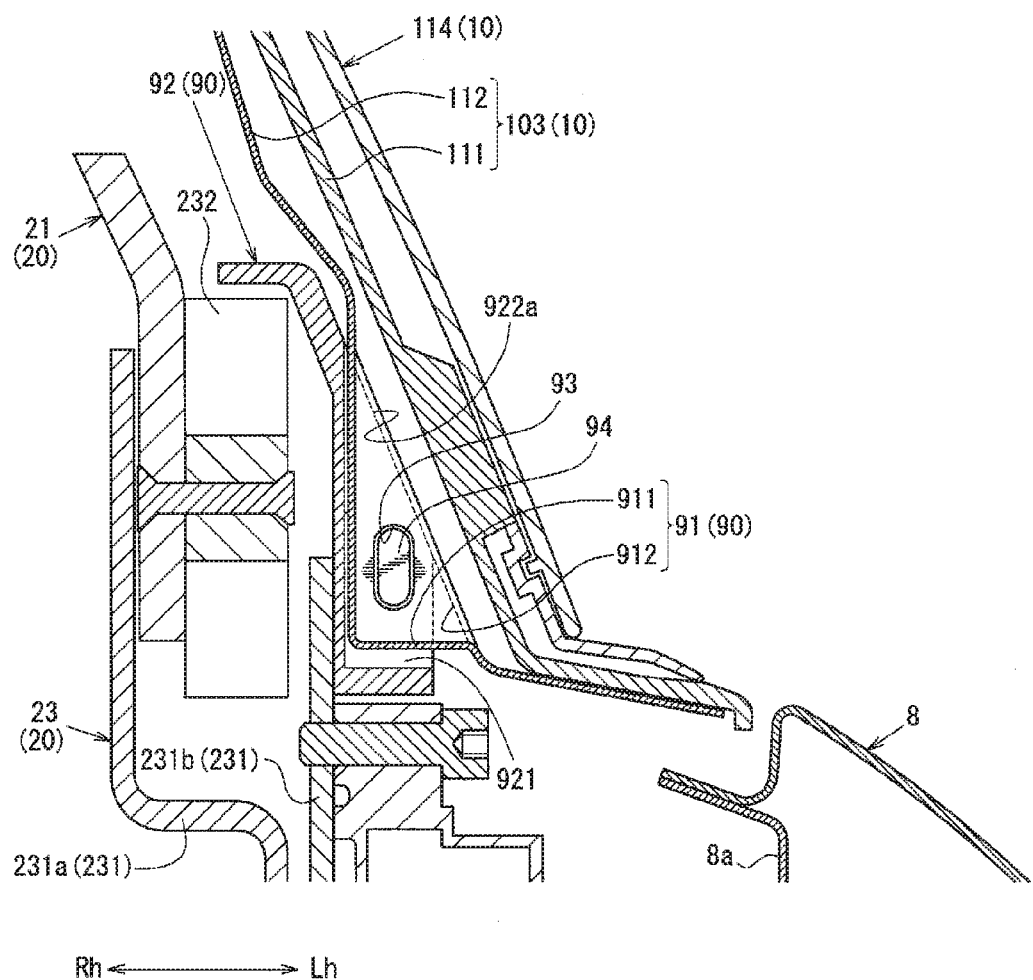
FIG. 9 is a sectional view of a front-lower regulation structure taken along the vehicle width direction according to the second embodiment.
Figure 10:
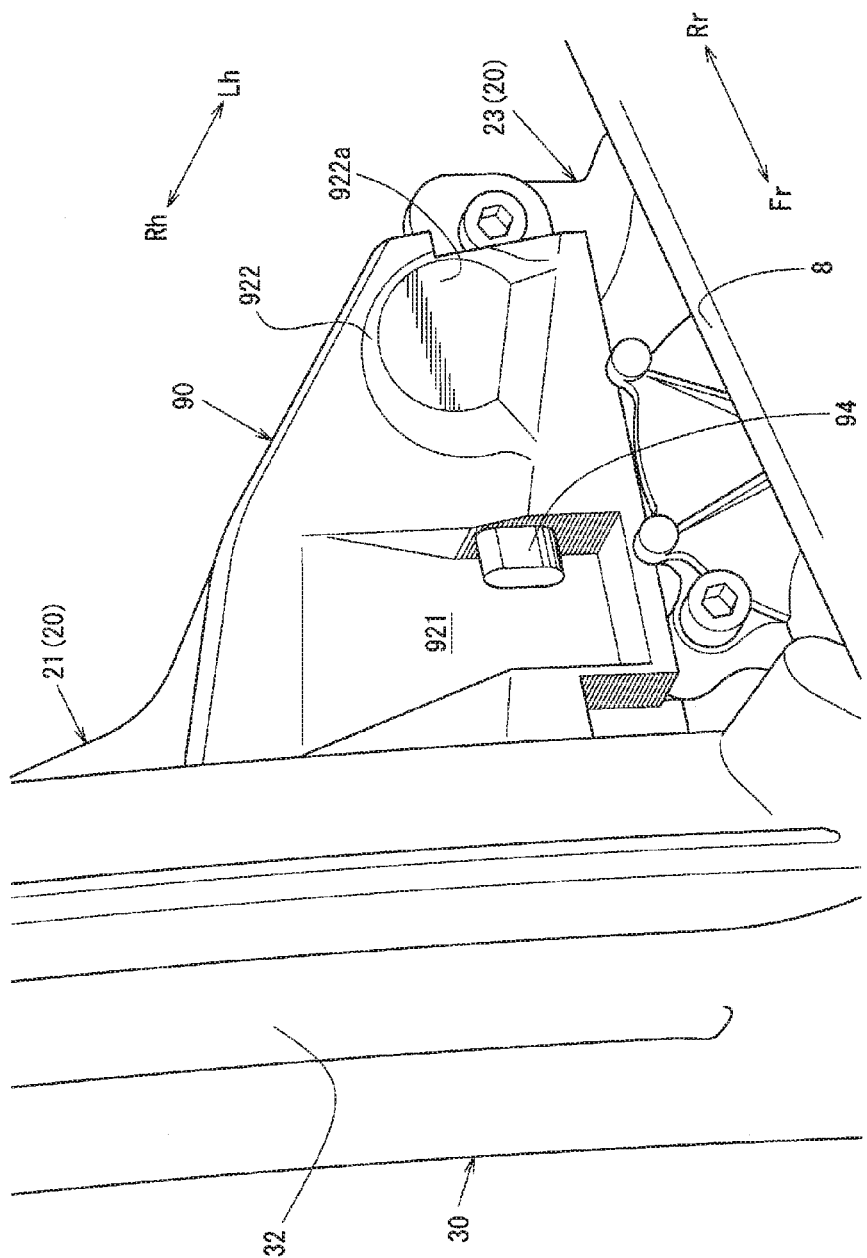
FIG. 10 is a major-part exterior perspective view showing a vehicle-body-side contact member, when viewed from the vehicle outside according to the second embodiment.

FIG. 8 is a side view showing the roof opening/closing mechanism 20 according to the second embodiment, when viewed from the vehicle outside, FIG. 9 is a sectional view of the front-lower regulation structure 90 taken along the vehicle width direction according to the second embodiment, and FIG. 10 is a major-part exterior perspective view showing a vehicle-body-side contact member 92, when viewed from the vehicle outside according to the second embodiment. The same structures as the above-described first embodiment are denoted by the same reference characters, detailed descriptions of which are omitted.

The front-lower regulation structure 90 of the second embodiment comprises, as shown in FIGS. 8 and 9, a cover-side contact portion 91 which is provided to protrude at the cover inner panel 112 of the deck cover 10 and a vehicle-body-side contact member 92 which is fixedly fastened to the roof link drive portion 23.

The cover-side contact portion 91 comprises, as shown in FIG. 9, a cover engagement portion 911 which protrudes inward and a cover slant portion 912 which is a slant portion of the cover inner panel 112, which are arranged side by side in this order from the vehicle front and formed integrally.

The cover engagement portion 911 is of a boxy shape, which has an L-shaped cross section taken along the vehicle width direction. This cover engagement portion 911 has a long oval hole 93 which is of a roughly longitudinal-long oval shape in the side view at its rear face. The cover slant portion 912 is configured such that its lower end is positioned on the outward side relative to its upper end and also the vehicle-body-side contact member 92 contacts the cover slant portion 912 in the vehicle width direction when the deck cover 10 is closed.

As shown in FIGS. 8 through 10, the vehicle-body-side contact member 92 is of a roughly trapezoidal shape in the side view, and fixedly fastened to an upper portion of the outer housing 231b of the roof link drive portion 23 at a position located in back of the pillar member 30.

The vehicle-body-side contact member 92 comprises, as shown in FIGS. 9 and 10, a recess portion 921 with which the cover engagement portion 911 of the cover-side contact portion 91 engages and a protrusion portion 922 which contacts the cover slant portion 912 of the cover-side contact portion 91 in the vehicle width direction, which are formed in this order from the vehicle front.

The recess portion 921 is provided at a front portion of the vehicle-body-side contact member 92 such that it is concaved inward in a roughly rectangular shape in the side view. Further, a lock portion 94 which protrudes forward is provided at a rear face of the recess portion 921.

The lock portion 94 is a pole-shaped body which has a roughly vertical-long oval shape in the front view, and has a size which is large enough to be inserted into the long oval hole 93 of the cover-side contact portion 91. This lock portion 94 is configured to be able to move forward or backward in the vehicle longitudinal direction in interlocking with the move (opening/closing) of the deck cover 10 by means of a solenoid (not illustrated) which is provided inside the vehicle-body-side contact member 92.

More specifically, the lock portion 94 is configured to take a state in which it is inserted into the long oval hole 93 of the cover-side contact portion 91 when the deck cover 10 is closed, whereas it goes back and gets away from the long oval hole 93 when the deck cover 10 is open. And, the lock portion 94 is configured to move forward and get inserted into the long oval hole 93 of the cover-side contact portion 91 when the deck cover 10 is closed.

The protrusion portion 922 is formed at a rear portion of the vehicle-body-side contact member 92 and configured to protrude outward in a roughly semicircular shape in the side view. An outward end face of the protrusion portion 922 is configured to slant such that its lower end is positioned on the outward side relative to its upper end, and formed as a contact face 922a which contacts the cover slant portion 912 in the vehicle width direction when the deck cover 10 is closed.

The rear vehicle-body structure of the vehicle 1 described above can suppress the position shift of the lower portion of the deck cover 10 relative to the vehicle body when the vertically-high and large-sized deck cover 10 is closed, similarly to the above-described first embodiment.

Further, since the cover-side contact portion 91 and the lock portion 94 contact each other in the vehicle vertical direction by means of the lock portion 94 of the vehicle-body-side contact member 92 which goes through the long oval hole 93, the present rear vehicle-body structure of the vehicle 1 regulates the move, in the vehicle vertical direction, of the deck cover 10.

Accordingly, when the vehicle travels with openable roof 5 being stored in the storage compartment S1, the present rear vehicle-body structure of the vehicle 1 can prevent the deck cover 10 from being raised due to the traveling air by regulating the upward move of the deck cover 10. Moreover, the present rear vehicle-body structure of the vehicle 1 can prevent the lower portion of the deck cover 10 from contacting the vehicle body even when any unexpected downward load is applied to the deck cover 10.

Therefore, the present rear vehicle-body structure of the vehicle 1 can prevent the unexpected load from being applied to the cover opening/closing mechanism 40 and also prevent the deck cover 10 from rattling (shaking) in the vehicle vertical direction.

That is, the present rear vehicle-body structure of the vehicle 1 can surely conduct the vehicle-width-direction positioning and the vehicle-vertical-direction positioning concurrently by the pair of right-and-left front-lower regulation structures 90. Thus, the present rear vehicle-body structure of the vehicle 1 can prevent the rattling of the deck cover 10 in the closed state with a simple structure, thereby suppressing contacting of the deck cover 10 with the vehicle body more surely.

Accordingly, the present rear vehicle-body structure of the vehicle 1 can stably hold the deck cover 10 being in the closed state as well as conduct the vehicle-width-direction positioning and the vehicle-vertical-direction positioning of the deck cover 10.

Herein, while the above-described first and second embodiments exemplify the openable roof 5 which is a hard top comprising the front roof 51 and the rear roof 52, a soft top comprising awning cloth and frame may be used as the openable roof 5.

Also, while the vehicle 1 is configured such that the openable roof 5 and the back window portion 12 are stored in the storage compartment S1, a vehicle in which the back window portion 12 is fixedly attached to the deck cover 10 and the openable roof 5 is stored in the storage compartment S1 may be applied. Alternatively, another vehicle in which a roof is a fixed type of roof covering over the cabin portion 6 and fixed to the vehicle body and the back window portion 12 is stored in the storage compartment S1 may be applied.

While the deck cover 10 of the above-described embodiments comprises the cover protrusion portions 101, the cover flat-face portion 102, the cover side wall portions 103, and the cover header portion 104, a deck cover which comprises a pair of right-and-left cover protrusion portions protruding in a roughly crest shape in the front view and a cover header portion interconnecting, in the vehicle width direction, upper ends of the cover protrusion portions may be used.

While the cover opening/closing mechanism 40 of the above-described embodiments is a type which is driven by the electric motor 233, an oil-pressure driven type of cover opening/closing mechanism may be used for moving the deck cover 10. Alternatively, another type of cover opening/closing mechanism which comprises a front cover link and a rear cover link which are pivotally connected the vehicle body and the deck cover 10 is movable by a driver's manual operation may be applied.

Further, the pair of right-and-left front-lower regulation structure may be provided with a guide portion to guide the move of the deck cover 10 in the opening/closing of the deck cover 10. Likewise, the pair of right-and-left front-upper regulation structure and the pair of right-and-left rear regulation structure may be provided with the guide portion to guide the move of the deck cover 10.

While the rear regulation structure 80 of the above-described embodiments comprises the hook portion 81 and the striker portion 82, there may be provided a rear regulation structure which regulates the position of the rear portion of the deck cover 10 by configuring that such that a concave portion provided on the side of the vehicle body engages with a convex portion provided on the side of the deck cover 10.

In correspondence between the present invention to the above-described embodiments, the roof of the present invention corresponds to the openable roof 5 of the embodiments. Likewise, the back window corresponds to the back window portion 12, the storage member correspond to the openable roof 5 and the back window portion 12, the cover opening/closing mechanism corresponds to the cover opening/closing mechanism 40, the header portion corresponds to the cover header portion 104, the positioning mechanism corresponds to the front-lower regulation structures 60, 90, the storage mechanism corresponds to the roof opening/closing mechanism 20, the cover-side positioning portion corresponds to the cover-side contact portions 61, 91, the vehicle-body-side positioning portion corresponds to the vehicle-body-side contact members 62, 92, the vehicle-width-direction contact portion corresponds to the portion where the cover slant portion 612 and the contact face 622a of the vehicle-width-direction regulation portion 622 contact each other and the portion where the cover slant portion 912 and the contact face 922a of the protrusion portion 922 contact each other, the vertical-direction contact portion corresponds to the portion where the cover flat-face portion 611 and the vertical-direction regulation portion 623 and the portion where the long oval hole 93 and the lock portion 94 contact each other, and the cover link member corresponds to the front cover link 41 and the rear cover link 42. However, the present invention is not to be limited to the above-described embodiments, and any other modifications or improvements may be applied within the scope of a spirit of the present invention.

What is claimed is:

1. A rear vehicle-body structure of a vehicle, comprising:
   a storage member comprising a roof covering over an upper portion of the vehicle;
   a storage compartment formed at a vehicle body for storing the storage member from above of the vehicle;
   a storage mechanism provided to interconnect said storage member and the vehicle body and store the storage member into said storage compartment; a deck cover provided to cover over the storage compartment, the deck cover comprising a pair of right-and-left cover side wall portions which are provided to be spaced apart from each other in a vehicle width direction and stand upward and a header portion which is provided to interconnect respective upper ends of the cover side wall portions at a position close to, in a vehicle longitudinal direction, the roof;

a cover opening/closing mechanism provided to move the deck cover upward;

a pair of right-and-left vehicle-body-side positioning mechanisms provided to regulate positions of respective lower portions of the cover side wall portions relative to the vehicle body;

a pair of right-and-left pillar members provided to extend upward at both-side portions of the vehicle body which are positioned in front of said storage compartment; and wherein said pair of right-and-left vehicle-body-side positioning mechanisms, said storage mechanism, and said pair of right-and-left pillar members are integrally configured.

2. The rear vehicle-body structure of the vehicle of claim 1, wherein the pair of right-and-left pillar members are provided close to, in the vehicle longitudinal direction, respective front portions of said pair of right-and-left cover side wall portions, wherein said pair of right-and-left vehicle-body-side positioning mechanisms are arranged close to said pair of right-and-left pillar members.

3. The rear vehicle-body structure of the vehicle of claim 2, wherein respective lower-portion sides of said pair of right-and-left cover side wall portions are configured as a pair of right-and-left cover-side positioning portions.

4. The rear vehicle-body structure of the vehicle of claim 1, wherein each of said pair of right-and-left vehicle-body-side is provided with a vehicle-width-direction contact portion to contact in the vehicle width direction and a vertical-direction contact portion to contact in a vehicle vertical direction.

5. The rear vehicle-body structure of the vehicle of claim 2, wherein each of said pair of right-and-left vehicle-body-side is provided with a vehicle-width-direction contact portion to contact in the vehicle width direction and a vertical-direction contact portion to contact in a vehicle vertical direction.

6. The rear vehicle-body structure of the vehicle of claim 3, wherein each of said pair of right-and-left vehicle-body-side is provided with a vehicle-width-direction contact portion to contact in the vehicle width direction and a vertical-direction contact portion to contact in a vehicle vertical direction.

7. The rear vehicle-body structure of the vehicle of claim 1, wherein said cover opening/closing mechanism comprises a cover link member which interconnects said deck cover and the vehicle body and a cover link drive portion which is fixedly attached to the vehicle body and rotates said cover link member, and said pair of right-and-left vehicle-body-side are arranged at a position which is spaced apart, in the vehicle longitudinal direction, from said cover link drive portion.

8. The rear vehicle-body structure of the vehicle of claim 2, wherein said cover opening/closing mechanism comprises a cover link member which interconnects said deck cover and the vehicle body and a cover link drive portion which is fixedly attached to the vehicle body and rotates said cover link member, and said pair of right-and-left vehicle-body-side are arranged at a position which is spaced apart, in the vehicle longitudinal direction, from said cover link drive portion.

9. The rear vehicle-body structure of the vehicle of claim 3, wherein said cover opening/closing mechanism comprises a cover link member which interconnects said deck cover and the vehicle body and a cover link drive portion which is fixedly attached to the vehicle body and rotates said cover link member, and said pair of right-and-left vehicle-body-side are arranged at a position which is spaced apart, in the vehicle longitudinal direction, from said cover link drive portion.

10. The rear vehicle-body structure of the vehicle of claim 4, wherein said cover opening/closing mechanism comprises a cover link member which interconnects said deck cover and the vehicle body and a cover link drive portion which is fixedly attached to the vehicle body and rotates said cover link member, and said pair of right-and-left vehicle-body-side are arranged at a position which is spaced apart, in the vehicle longitudinal direction, from said cover link drive portion.

11. The rear vehicle-body structure of the vehicle of claim 5, wherein said cover opening/closing mechanism comprises a cover link member which interconnects said deck cover and the vehicle body and a cover link drive portion which is fixedly attached to the vehicle body and rotates said cover link member, and said pair of right-and-left vehicle-body-side are arranged at a position which is spaced apart, in the vehicle longitudinal direction, from said cover link drive portion.

12. The rear vehicle-body structure of the vehicle of claim 6, wherein said cover opening/closing mechanism comprises a cover link member which interconnects said deck cover and the vehicle body and a cover link drive portion which is fixedly attached to the vehicle body and rotates said cover link member, and said pair of right-and-left vehicle-body-side are arranged at a position which is spaced apart, in the vehicle longitudinal direction, from said cover link drive portion.

13. The rear vehicle-body structure of the vehicle of claim 1, wherein the storage member further comprises a back window positioned in back of the roof.

14. A rear vehicle-body structure of a vehicle, comprising:

a storage member comprising a back window;

a storage compartment formed at a vehicle body for storing the storage member from above of the vehicle;

a storage mechanism provided to interconnect said storage member and the vehicle body and store the storage member into said storage compartment;

a deck cover provided to cover over the storage compartment, the deck cover comprising a pair of right-and-left cover side wall portions which are provided to be spaced apart from each other in a vehicle width direction and stand upward and a header portion which is provided to interconnect respective upper ends of the cover side wall portions at a position close to, in a vehicle longitudinal direction, the back window;

a cover opening/closing mechanism provided to move the deck cover upward;

a pair of right-and-left vehicle-body-side positioning mechanisms provided to regulate positions of respective lower portions of the cover side wall portions relative to the vehicle body;

a pair of right-and-left pillar members provided to extend upward at both-side portions of the vehicle body which are positioned in front of said storage compartment; and wherein said pair of right-and-left vehicle-body-side positioning mechanisms, said storage mechanism, and said pair of right-and-left pillar members are integrally configured.

15. The rear vehicle-body structure of the vehicle of claim 14, wherein the storage member further comprises a roof covering over an upper portion of the vehicle.

\* \* \* \* \*